United States Patent
Herden et al.

Patent Number: 6,130,535
Date of Patent: Oct. 10, 2000

[54] MEASURING DEVICE FOR DETERMINATION OF ROTARY ANGLE BETWEEN STATOR AND ROTOR

[75] Inventors: Werner Herden, Gerlingen; Friedrich Bielert, Goettingen, both of Germany

[73] Assignee: Robert Bosch GmbH, Stuttgart, Germany

[21] Appl. No.: 09/011,284

[22] PCT Filed: Feb. 5, 1997

[86] PCT No.: PCT/DE97/01421

§ 371 Date: Feb. 9, 1998

§ 102(e) Date: Feb. 9, 1998

[87] PCT Pub. No.: WO98/08060

PCT Pub. Date: Feb. 26, 1998

[30] Foreign Application Priority Data

Aug. 24, 1996 [DE] Germany ............... 196 34 282

[51] Int. Cl.⁷ ............... G01B 7/14; G01B 7/30
[52] U.S. Cl. ............... 324/207.2; 324/207.25
[58] Field of Search ............... 324/207.2, 207.21, 324/207.23, 207.24, 207.25, 173, 174, 175, 166, 117 H; 338/32 R, 32 H

[56] References Cited

U.S. PATENT DOCUMENTS

| | | | |
|---|---|---|---|
| 4,829,248 | 5/1989 | Loubier | 324/207.2 |
| 5,444,369 | 8/1995 | Luetzow | 324/207.25 |
| 5,869,962 | 2/1999 | Kasumi et al. | 324/207.2 |

FOREIGN PATENT DOCUMENTS

| | | |
|---|---|---|
| 0665416 | 8/1995 | European Pat. Off. |
| 2670286 | 6/1992 | France |
| 1548591 | 3/1970 | Germany |

*Primary Examiner*—Jay Patidar
*Attorney, Agent, or Firm*—Michael J. Striker

[57] ABSTRACT

A measuring device for contactless determination of a rotary angle consists of a rotor (11) and a stator (10). Two ring magnets (21, 22) are disposed in the inner wall of the rotor (11), which have oppositely oriented magnetic polarities. A Hall element (16) is arranged in a slit-like air gap (14) in the stator (10). Furthermore, an additional magnet (17) is located in a second slit-like air gap (15), which creates a magnetic bias in the Hall element (16), so that the linear measuring area A does not have a change of sign.

6 Claims, 2 Drawing Sheets

MEASURING DEVICE FOR DETERMINATION OF ROTARY ANGLE BETWEEN STATOR AND ROTOR

BACKGROUND OF THE INVENTION

The invention relates to a measuring device for the contactless determination of a rotary angle. A measuring device is known form FR-OS 90 15 223, wherein a stator and a rotor are moved in relation to each other. There is a narrow air gap between the stator, which respectively is made of a magnetically conducting material, and the rotor. A first ring-shaped permanent magnet is arranged over a length of 180° in the rotor and is radially polarized. A second ring-shaped. permanent magnet of opposite polarization is located in the remaining area of the stator, also amounting to 180°. The stator furthermore has two air gaps located diametrically opposite each other. A Hall sensor is arranged in at least one of these air gaps. The strength of the magnetic field extending through the Hall sensor changes with a rotary movement of the rotor in relation to the stator. But the linear measuring range of the measuring signal generated in this manner is limited to ±75°. This linear measuring range furthermore has a change of the sign. It would be possible in an elaborate manner to remove this sign change with the aid of an electrical circuit.

SUMMARY OF THE INVENTION

Accordingly, it is an object of the present invention to provide a measuring device for contactless determination of rotary angle, in which an additional magnet is arranged in a magnetic field of the at least one ring magnet and has a magnetic flux extending through an element which is sensitive to a magnetic field and providing a parallel displacement of a measuring curve.

The measuring device in accordance with the invention for the contactless determination of a rotary angle has the advantage, that a linear measuring range of more than ±110° is possible, without a sign change in the measuring voltage occurring in the linear measuring range. This sign change-free linear measuring range is possible in both directions of rotation of the measuring device, that is in a positive or negative direction of rotation. By means of this, two linear measuring ranges are also obtained. With the aid of the additional magnets it is possible in a simple manner to achieve a sign change-free linear measuring range by the vertical displacement of the measurement curve. The vertical displacement of the measurement curve can be controlled in a simple manner by means of the strength and the polarization direction of the additional magnet. The direction of displacement is a function of the direction of magnetization of the additional magnet. The created magnetic bias of the magnetic field-sensitive element, and thus the displacement of the measurement curve, is independent of the angle of rotation. Furthermore, the magnetic bias when the rotor is turned, i.e. during the measurement itself, is constant.

BRIEF DESCRIPTION OF THE DRAWINGS

Exemplary embodiments of the invention are represented in the drawings and will be explained in more detail in the following description.

A longitudinal section through a first exemplary embodiment with two ring magnets is represented in FIG. 1, in FIG. 2 an exemplary embodiment of the measuring device with only one ring magnet, in FIGS. 3 a third exemplary embodiment with a slit passing through the stator.

DESCRIPTION OF THE PREFERRED EMBODIMENTS

Figure 1:
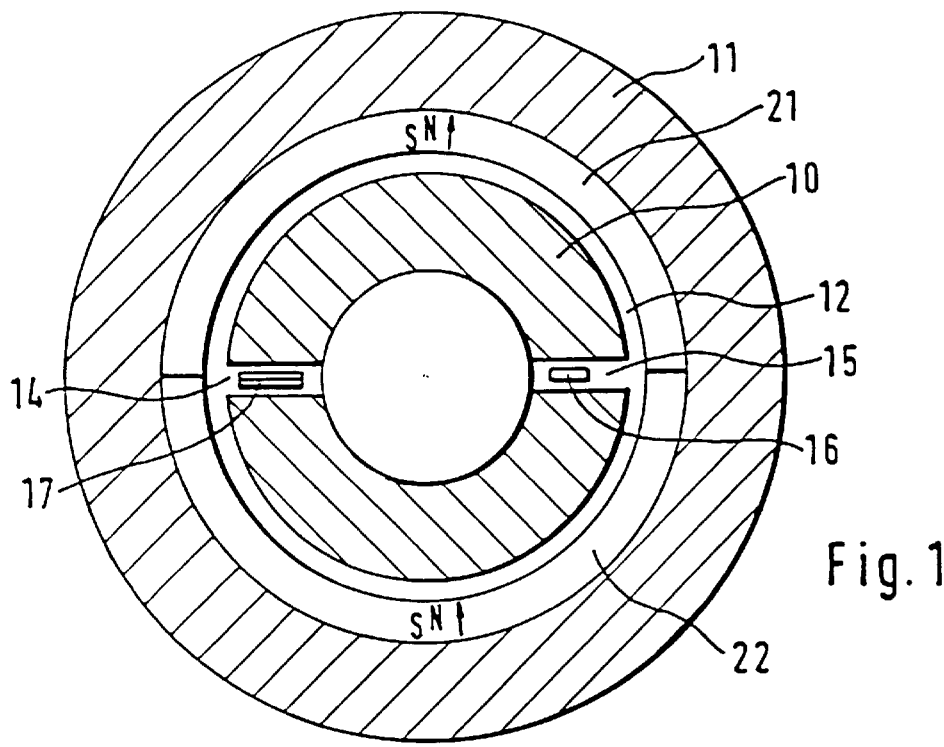

A stator is identified by 10 in FIG. 1 and is surrounded by a rotor 11. There is an air gap 12 between the stator 10 and the rotor 11, which should be as narrow as possible and in actuality is approximately 0.5 mm. The stator 10 and the rotor 11 are made of a magnetically conductive material of high permeability and low magnetic hysteresis. In the present case this can be soft iron, for example. The stator 10 furthermore has two slit-like air gaps 14, 15, which are located diametrically opposite each other, wherein at least one Hall element 16, by means of which the relative movements of the rotor 11 in relation to the stator 10 are determined, is located at least in the air gap 15. It is possible to use any other magnetically sensitive component in place of a Hall element, for example a field plate, a magnetic transistor, a magnetoresistive element, etc. But it is important in this case that the output signal of the magnetically sensitive component is dependent as linearly as possible from the magnetic induction B. An additional magnet 17 is arranged in the second air gap 14 and is oriented in such a way that its polarity is aligned parallel with the extension of the field lines in the stator 10. A permanent magnet is particularly suited as the additional magnet 17.

In order to be able to generate a measuring signal with the aid of the Hall element 16, a first (21) and second (22) ring magnet have been inserted into the inner wall of the rotor 11 facing the stator 10. Both ring magnets (21, 22) have an angular range of 1800. The magnetic polarization of the two ring magnets 21, 22 is respectively radially and oppositely oriented, which means that, for example, with the first ring magnet 21, the magnetic north pole is on the inner wall of the rotor 11, as represented in FIG. 1, while with the second ring magnet 22 the magnetic south pole is located on the inner wall of the rotor 11. Standard commercial permanent magnets can be used as ring magnets 21, 22, as well as the additional magnet 17. It is also possible to magnetize the ring magnets, or respectively the additional magnet, prior to their installation. However, it is advantageous if the permanent magnet, or respectively the magnetic material for the ring magnets, is embedded in a plastic material. In this case the magnetic material can be realized by means of an extrusion process. A high degree of measuring accuracy and a cost-effective production of the ring magnets 21, 22 is possible by means of this. In addition, the ring magnets can be directedly extruded into the recesses of the rotor during the plastic extrusion process. $SmCo_5$, $Sm_2Co_{17}$, NdFeB, AlNiCo or ferrite can be used as the magnetic material, for example. The orientation of the additional magnet 17 is such that its magnetic flux is added to or subtracted from the magnetic flux of the ring magnets 21, 22, so that a magnetic bias of the element sensitive to a magnetic field occurs, regardless of its angle of rotation.

Figure 4:
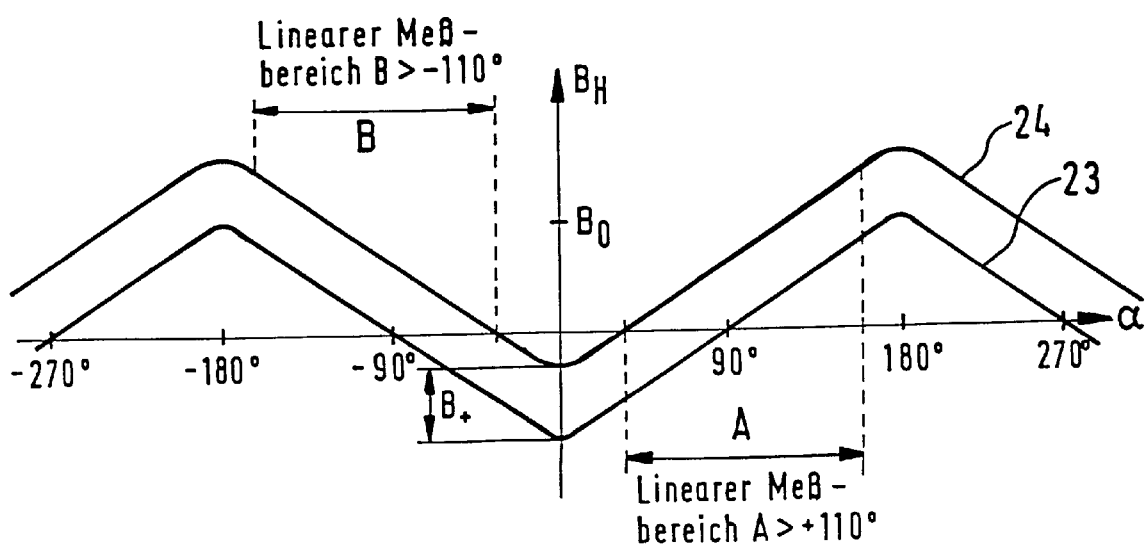
FIG. 4 shows the course of the measurement curve, i.e. of the induction B over the angle of rotation a with and without an additional magnet.

A magnetic flux 25 is created in the rotor 11 and in the stator 10 because of the ring magnets 21, 22. Here, the magnetic field lines of this magnetic flux 25 extend from the magnetic north pole of the first ring magnet 21 through the rotor 11 to the south pole of the second ring magnet 22, or respectively from the north pole of the second ring magnet 22 via the air gap 12 to the south pole of the first ring magnet 21. The path of the magnetic flux here also passes through the Hall element 16 arranged in the air gap 15. Furthermore, the magnetic lines of magnetic flux of the additional magnet 17 in the stator 10 also extend from the north pole to the south pole of the additional magnet 17, wherein the direction of polarization is aligned in such as way that the magnetic lines of the additional magnet 17 in the area of the Hall element 16 extend parallel with and in the same direction as the magnetic lines of the ring magnets 21, 22. The magnetic flux can of course also extend in the opposite direction. Magnetic flux from the additional magnet 17 therefore already flows through the Hall element 16 even when the measuring device is at a standstill, which creates a magnetic induction B in the Hall element 16. If now the rotor 11 moves in relation to the stator 10, i.e. an angular movement is defined, the magnetic flux 25 through the Hall sensor 16 increases or decreases as a function of the direction of rotation. In connection with this, the flux change (induction B) is plotted in FIG. 4 over the angle of rotation. Here, the course of a measurement curve without an additional magnet 17 is represented by the number 23, and the course of a measurement curve with the additional magnet 17 present can be seen by the number 24. Because of the structural design, in this case the change in the strength of the magnetic flux is linear in respect to the angle of rotation of the rotor 11 to be determined in relation to the stator 10 since, because of the homogeneous radial magnetization of the two ring magnets 21, 22, a constant flux increase (induction B), or respectively a constant flux decrease per unit of angle is created within the area of the angle of rotation. As can be seen in FIG. 4, the linear measuring area A in the linear measuring area does not have a change of sign. Because of the strength of the additional magnet 17, the measurement curve can be displaced in such a way, that with the measurement curve 24 (with the additional magnet 17) the linear area A no longer has a change of sign. In an ideal manner in this case the beginning of the linear measuring area A can be placed into the zero point of the induction B. It should also be mentioned that in a known manner the magnetic induction B generates an electrical output signal in the Hall element 16, which extends linearly to the angle of rotation to be determined. In connection with the embodiment in accordance with FIG. 1 it would of course also basically be possible to interchange the respective embodiments of the rotor and the stator.

Figure 2:
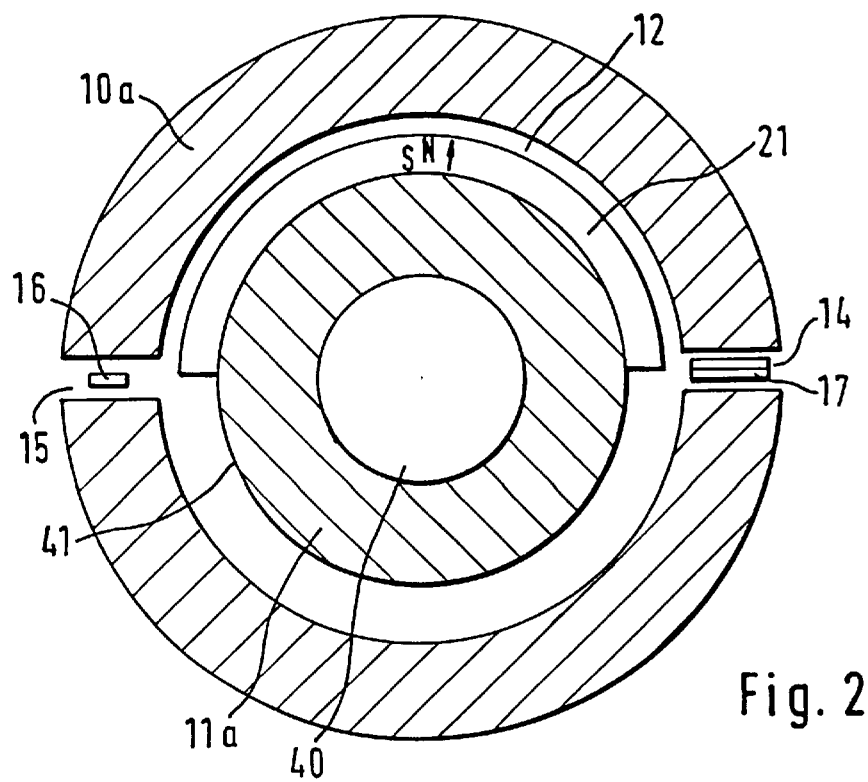

With the embodiment in accordance with FIG. 2, the rotor 11a is arranged in the interior of the stator 10a. In this case the stator 10a is embodied as a ring and again has the two slit-like air gaps 14, 15. The Hall element 16 again is in the air gap 15, and the additional magnet 17 in the air gap 14, which again have the purposes and properties as in the exemplary embodiment in accordance with FIG. 1. It is of course possible to arrange the additional magnet 17 and the Hall element 16 interchanged in the respective gaps 14, or respectively 15. The rotor 11a is connected with a shaft 40, whose rotary movement is to be determined, and projects into the interior of the stator 10a, wherein again the small air gap 12 is located between the rotor 11a and the stator 10a. In contrast to the exemplary embodiment in accordance with FIG. 1, only the first ring magnet 21 is provided, its design corresponds to that in accordance with FIG. 1. This is possible, in particular in case where no very high demands are made on the linearity of the measuring area A. The area between the ends of the ring magnet 21 is now filled with a magnetically non-conducting material, for example air or plastic, in place of the second ring magnet. Therefore, in the embodiment in accordance with FIG. 2, the ring magnet 21 has been placed into a recess 41 in the outer wall of the stator 11a. The mode of functioning corresponds to that of the measuring device in accordance with FIG. 1. In the course of the rotating movement of the rotor in respect to the stator, the magnetic induction B in the area of the Hall element 16 is changed and therefore a measuring signal generated. The magnetic flux of the additional magnet 17 again generates a constant, permanent magnetic bias in the Hall element 16. In this case the magnetic flux of the ring magnet 21 extends over the air gap 12, through the stator 10a back into the air gap 12 and the rotor 11a to the south pole of the ring magnet 21.

Figure 3:
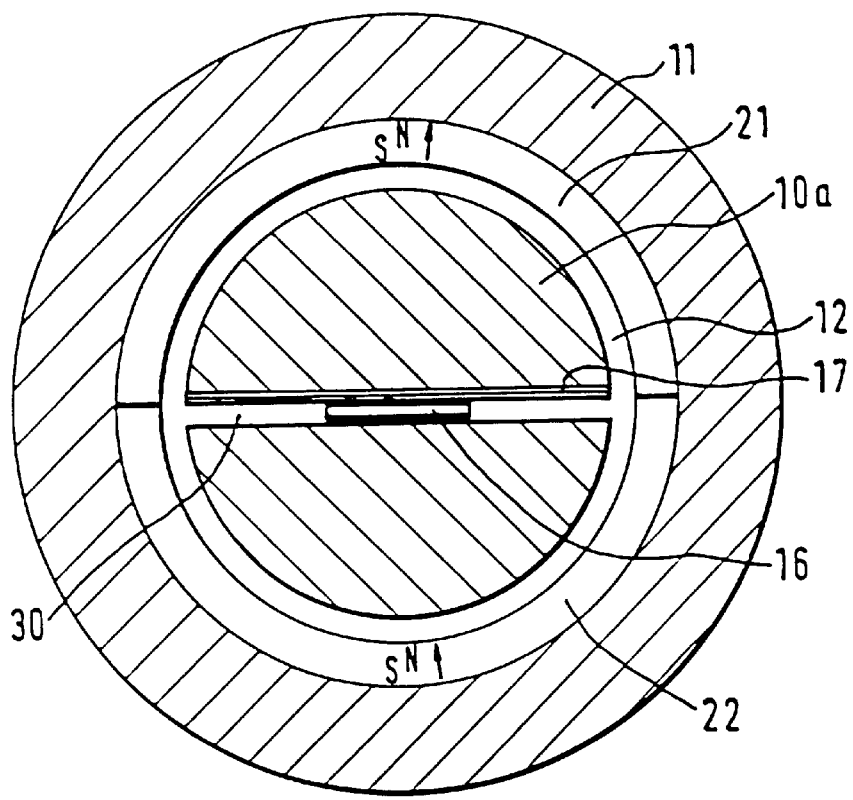

In its structural design, the exemplary embodiment in accordance with FIG. 3 corresponds to that in FIG. 1. While in the exemplary embodiment in accordance with FIG. 1 two slits 14, 15 are provided in the stator 10 for the additional magnet 17, or respectively the Hall element 16, a continuous slit 30 is provided in the exemplary embodiment in accordance with FIG. 3. Here, the stator 10a is embodied as a solid body. Viewed in the axial direction of the slit 30, the Hall element 16 is arranged in the center of the slit 30. The additional magnet 17 takes up the entire width of the gap 30. In contrast to the embodiment in accordance with FIG. 1, in the exemplary embodiment in accordance with FIG. 3 the field lines of the additional magnet 17 are not closed in the stator 10 itself, but extend over the gap 12 in the outer iron ring of the rotor 10. Since this iron ring of the rotor 10 is dynamically balanced, the magnetic bias of the Hall element 16 remains constant during the rotation of the rotor 10 because of the additional magnet 17.

In place of the stator and rotor arranged on top of each other in the exemplary embodiments, the stator and rotor can also be embodied as disks arranged next to each other.

What is claimed is:

1. A measuring device for contactless determination of a rotary angle between a stator provided with at least one air gap and a rotor located relative to the stator so that another air gap is formed between the stator and the rotor, the measuring device comprising at least one element which is sensitive to a magnetic field and located in said at least one air gap; at least one ring magnet member having a magnetic polarization oriented in a radial direction and arranged on the rotor and an additional magnet arranged on the stator in a magnetic field of said at least one ring magnet, said additional magnet having an additional magnetic field with a magnetic flux which extends through said element sensitive to a magnetic field.

2. A measuring device as defined in claim 1, wherein said additional magnet is arranged in said at least one air gap adjacent to said at least one element sensitive to a magnetic field.

3. A measuring device as defined in claim 1, wherein said additional magnet extends over an entire width of said at least one air gap.

4. A measuring device as defined in claim 1, wherein the stator has a further air gap, said additional magnet being arranged in said further air gap.

5. A measuring device as defined in claim 1; and further comprising a further ring magnet member arranged on the rotor, said at least one ring magnet member and said further ring magnet member forming ring magnet.

6. A measuring device as defined in claim 4, wherein said at least one air gap and said further air gap in said stator located at a distance of 180° from one another.

* * * * *